June 15, 1954

G. C. BARTON ET AL 2,680,863

LASTING MACHINE

Filed March 31, 1951

*Inventors*
George C. Barton
Harold E. Elliott
By their Attorney
Thomas J. Ryan

Inventors
George C. Barton
Harold E. Elliott
By their Attorney
Thomas J. Ryan

June 15, 1954 G. C. BARTON ET AL 2,680,863
LASTING MACHINE
Filed March 31, 1951 10 Sheets-Sheet 8

Inventors
George C. Barton
Harold E. Elliott
By their Attorney
Thomas Ryan

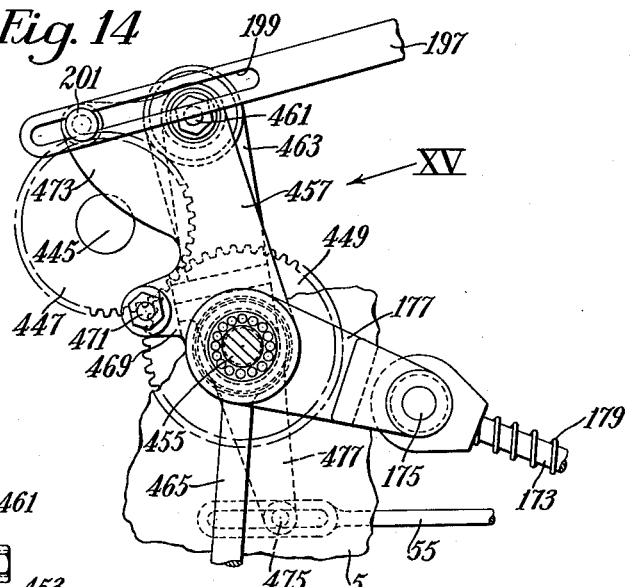
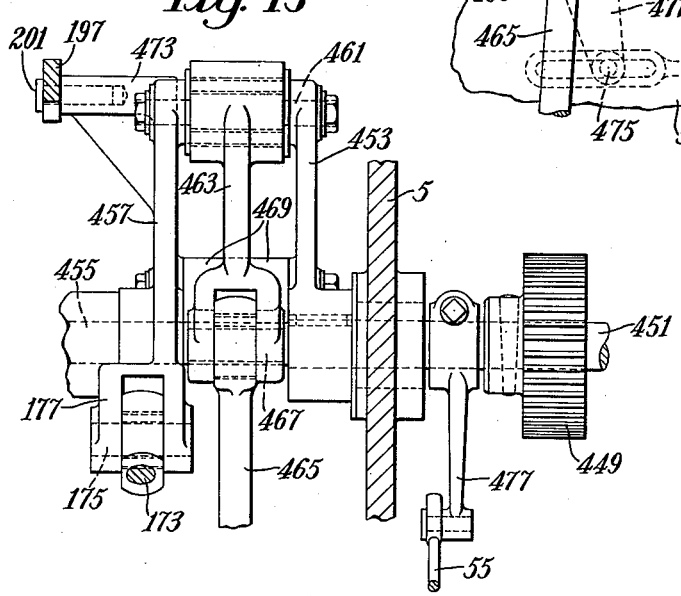
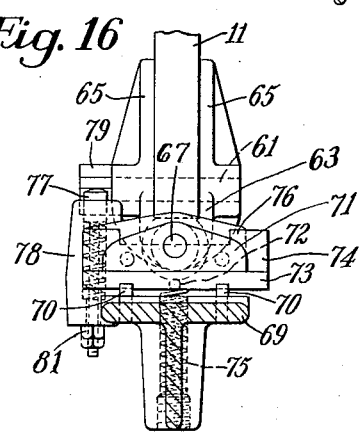

Patented June 15, 1954

2,680,863

UNITED STATES PATENT OFFICE 2,680,863

LASTING MACHINE

George Clifford Barton and Harold Ernest Elliott, Leicester, England, assignors to United Shoe Machinery Corporation, Flemington, N. J., a corporation of New Jersey Application March 31, 1951, Serial No. 218,592

Claims priority, application Great Britain April 25, 1950

26 Claims. (Cl. 12—12.4)

This invention relates to lasting machines and is herein shown as embodied in a toe-lasting machine which resembles in some respects a machine disclosed in United States Letters Patent No. 2,097,567, granted on November 2, 1937, on an application of F. B. Keall. The machine shown and described in said Letters Patent is a machine for lasting the toe ends of welt shoes by means of toe-embracing wipers, each shoe being positioned in proper relation to the wipers by means including a plate arranged to engage the inner face of the usual lip or rib on the insole around the end and along the sides of the toe. It is one of the objects of the present invention to provide a machine for lasting shoes of a kind in which the margin of the toe end of the upper is secured in lasted relation to an insole by cement in a position generally parallel to the bottom of the last, there being no lip or rib on the insole, and more particularly to provide means for properly supporting and positioning shoes of that kind for the toe-lasting operation. It is to be understood, however, that in various novel aspects the invention is not limited as to the kind of shoes operated upon or to the illustrative embodiment.

With the above and other objects in view, the machine herein shown includes a toe rest arranged to support the toe end of a shoe presented bottom upward and a heel-end support having a last pin arranged to enter the usual spindle hole in the heel end of the last, the toe rest and the heel-end support being separately movable yieldingly in a downward direction with the shoe by a shoe-bottom rest which engages the shoe on the bottom of the forepart and which the operator moves from a retracted positioned forwardly and downwardly by the swinging of an operating arm. Mounted to move downwardly with the heel-end support is a heel rest which is further movable lengthwise of the shoe by the above-mentioned operating arm into engagement with the heel end of the shoe after the shoe has been properly positioned relatively to the toe wipers, its position lengthwise being determined by a toe-end gage against which the operator places its toe-end face in presenting it to the machine. To permit the toe end of each right or left shoe to be otherwise positioned, as determined by sight, in proper relation to the wipers after the heel end of the last has been mounted on the last pin, the heel-end support and the heel rest are mounted to swing as a unit about an axis extending lengthwise of the shoe, the heel-end support being further mounted to swing yieldingly about such an axis relatively to the heel rest. The machine herein shown is still further provided with means controlled by the movement of the above-mentioned operating arm for locking the toe rest, the heel-end support and the heel rest against further downward movement, for locking the heel rest against retractive movement lengthwise of the shoe and against any further swinging movement in directions widthwise of the shoe, and for moving the toe-end gage to inoperative position.

Further to accomplish the objects of the invention the machine herein shown is provided with an insole edge hold-down supported and guided independently of the shoe-bottom rest for movement into engagement with the margin of the insole around the toe to hold it on the bottom of the last and thus to prevent its displacement by the wipers. This holddown includes a plate so formed as to permit the margin of the upper to be wiped preliminarily inward over it while it is in engagement with the insole, thus insuring against any premature adherence of the cement-coated margin of the upper to the insole in the toe-lasting operation. Provision is afforded for moving the insole edge holddown to operative position simultaneously with the shoe-button rest by the movement of the previously mentioned operating arm, but for releasing it and for withdrawing it from the insole while the shoe-bottom rest is still in operative position to permit the wipers to press the margin of the upper into position to adhere to the insole. The edge holddown plate is further so formed and controlled that after its release it is deflected from between the wipers and the insole by engagement of the margin of the upper therewith. Since the machine may sometimes be used for lasting shoes which are presented to the machine and secured in position for the lasting operation prior to the trimming of the margin of the lining and the toe box and prior to the application of cement to the upper and the insole, the construction shown is further such that the insole edge holddown member may be caused to remain in its inoperative position while the other shoe-controlling members are moved to their operative positions by the operating arm and may be later moved separately into operative position after the trimming operation has been performed and the cement has been applied.

Novel features of the invention involved in the construction above outlined, including various novel details of construction and combinations of parts, will now be more particularly described with reference to the accompanying drawings and thereafter pointed out in the claims.

In the drawings,

Fig. 14 is a detail view in rear elevation of a portion of the operating mechanism;

Fig. 15 is a view in elevation in the direction of the arrow XV in Fig. 14; and

Fig. 16 is a detail view in right-hand side elevation of a centrilizing device associated with a heel-end support forming part of the shoe-supporting and positioning means.

The machine in which the invention is herein shown as embodied has a base casting comprising a pair of side members 1 (Figs. 1 and 2) which support a multi-part main frame 3 somewhat boxlike in form, this frame having a front wall with a U-shaped opening therein and having also a partition 5 (Fig. 2) extending from side to side thereof and dividing it into what may be termed front and rear compartments. The front compartment is open at the top and houses some of the shoe-controlling instrumentalities of the machine, while the rear compartment has a back wall provided with a readily detachable cover plate (not shown). Secured to the frame 3 at the left-hand side thereof is a casting 9 having a cylindrical portion with a vertical bore therein to serve as a guide for means supporting the toe wipers and parts associated therewith, as hereinafter described.

Figure 11:
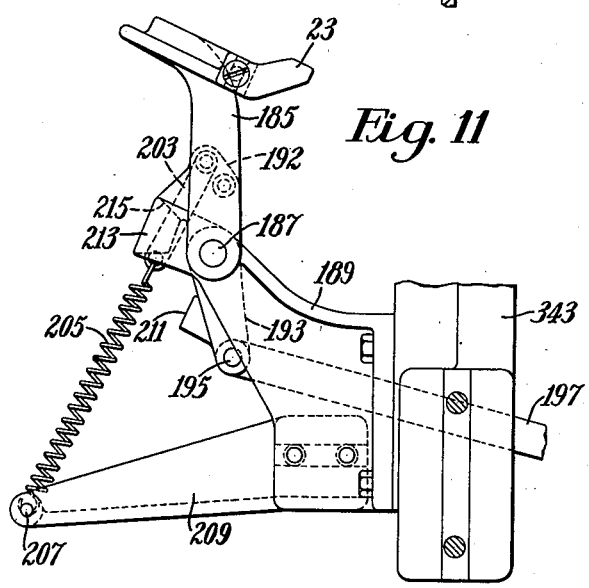
Fig. 11 is a view in front elevation of a toe-end gage and parts associated therewith.

For supporting and positioning the shoe, including an upper and an insole mounted on a last with the upper in pulled-over condition, the machine is provided with a post 11 (Figs. 1 and 4) having an enlarged upper portion 13 which carries a last pin 15 arranged to enter the usual spindle hole in the heel-end portion of the last; a heel rest 17 (Figs. 1, 2 and 4) arranged to engage the heel-end face of the shoe; a toe rest 19 (Fig. 1) arranged to engage the top of the forepart of the shoe underneath; a shoe-bottom rest 21 (Figs. 1 and 2) between which and the toe rest the forepart of the shoe is clamped; a toe-end gage 23 (Figs. 1, 2 and 11) arranged initially to position the shoe lengthwise by engagement with its toe-end face; and an insole edge holddown 25 (Figs. 1, 2 and 7) arranged to support the edge of the insole against buckling when the toe wipers, hereinafter described, wipe the marginal portion of the upper inwardly over the toe end of the insole. Much of the mechanism for operating or controlling these parts lies behind the partition 5 of the frame in the above-mentioned rear compartment.

The toe rest 19 comprises a rubber pad having an upper-engaging surface shaped to receive the forepart portion of the shoe. This pad is mounted on a plate 26 (Figs. 1 and 2) secured to the upper end of a post 27 which is vertically movable in alined bores formed in bosses 29 and 32 on the frame. This toe post has a lower portion 35 of reduced diameter extending downwardly through a sleeve 37 which is threaded in a bore formed in a boss 39 on the frame, the sleeve 37 having formed on its lower end a head 43 by which it may be turned to adjust it heightwise in the boss 39. Below the sleeve the portion 35 of the post is threaded and has a nut 38 thereon. Surrounding the portion 35 of the post between a shoulder on the post and the upper end of the sleeve 37 is a compression spring 41 which tends to move the post in an upward direction, its upward movement being limited by engagement of the nut 38 with the head 43 of the sleeve 37. Adjustment of the sleeve, therefore, determines the height of the toe rest before a shoe is presented to the machine. The post 27 is prevented from turning by a vertical guide rib formed on a guide plate 28 (Fig. 2) secured to the frame, this rib extending into a slot in the plate 26.

When a shoe is presented to the machine the toe rest 19 may move downwardly against the resistance of the spring 41 as the shoe-bottom rest is moved downward to position the shoe as hereinafter described, but near the end of the downward movement of the shoe-bottom rest the toe rest is locked against further downward movement by one or the other of a pair of staggered pawls 45 mounted on a shaft 47 extending forwardly and rearwardly through bores formed in lugs on the boss 32. Such locking of the toe rest enables it to support the shoe firmly against downward pressure of the wipers thereon and insures that the shoe will be firmly clamped between it and the shoe-bottom rest. For the purpose described the pawls 45 are caused, at the required time, to engage a rack 51 secured to the post 27, the pawls being forced into engagement with the rack by springs 53. They are held initially out of engagement with the rack through a link 55 pivotally connected at its left-hand end to a pin 57 extending rearwardly from an arm 59 which is secured to the shaft 47. The front one of the two pawls is secured on this shaft, but the other is freely rotatable thereon. Extending forwardly from the rear pawl is a pin 49 which lies at the left-hand side of the front pawl, and when the latter is moved to disengage it from the rack 51 it acts through this pin to disengage the rear pawl also from the rack. The means for operating the link 55 to control the pawls will be hereinafter described.

The lower end of the heel-end supporting post 11 which carries the last pin 15 has secured therein a pin 61 (Figs. 1, 4 and 16) by means of which it is mounted for swinging movements in directions lengthwise of the shoe on a bracket 63 provided with arms 65 extending upwardly at the front and rear of the lower end of the post to assist in controlling the post. The bracket 63 is secured on a pin 67 extending in directions lengthwise of the shoe and mounted to turn in a bearing formed in an upwardly extending lug on a carrier bracket 69. The end portion of the pin 67 extending beyond the right-hand side of the lug has fast thereon a forwardly and rearwardly extending centralizing lever 71 engaged on its lower face by a hardened plate 73. A pin 72 extending from the above-mentioned lug into a slot in the plate 73 midway between the front and rear ends of the plate holds the plate against forward or rearward movement while permitting tipping movements thereof, the plate being further controlled by pins 70 (Fig. 16) extending upwardly from the bracket 69 at the right of the plate as viewed from the front of the machine. The front and rear ends of the plate 73 lie beneath flat lower faces formed on ears 74 on a bracket 76 secured to the above-mentioned lug on the bracket 69. The plate 73 is engaged centrally underneath by a compression spring 75 mounted in a downwardly extending bore in the bracket 69. The post 11, therefore, may be swung to some extent forwardly and rearwardly about the axis of the pin 67 against the resistance of the spring 75, such movement of the post serving to depress one or the other of the ends of the plate 73 away from the corresponding ear 74 and being limited by engagement of the plate with the bracket 69. It will be understood that the spring 75 holds the post normally in a central position with respect to such forward and rearward movements. The post 11 also may swing in directions lengthwise of the shoe about the axis of the pin 61, such movement of the post toward the right with reference to Fig. 4 being yieldingly resisted by a spring-pressed plunger 77 mounted in a bore formed in a forward extension 78 of the bracket 69, the plunger acting on an arm 79 secured to the pin 61. Upward movement of the plunger 77 is limited by engagement of a nut 81 on a downwardly extending stem of the plunger with the lower face of the extension 78. The plunger serves initially to hold the last pin 15 far enough away from the heel rest 17 to permit the operator to mount a last on the last pin without interference of the heel rest with the shoe.

The carrier bracket 69 is secured to the lower end portion of an upwardly and downwardly extending tubular member 83 (Figs. 1 and 4), and fast on the upper end portion of this member is a block 85 which supports the heel rest 17. The heel rest is V-shaped in plan and is pivotally mounted by means of a pin 87 extending widthwise of the shoe on a carrier 89 which has a stem 91 extending lengthwise of the shoe in a bore in the block 85. The stem 91 is rotatable in the bore and is retained therein by means of a screw 86 threaded in the block 85 and extending into a peripheral groove in the stem. Rotation of the carrier 89 and the heel rest about the axis of the stem 91 is limited by a pin 90 extending from the carrier into a recess in the block 85.

The tubular member 83 thus supports both the heel rest 17 and the post 11 with the last pin 15 thereon for upward and downward movements in unison by reason of the fact that the member 83 is mounted thus to move relatively to a casting 93. The member 83 is guided in its upward and downward movements by means of four spool-shaped rolls 95 freely rotatable on studs 97 in the casting 93, two of the rolls being arranged to engage the member respectively on its front and rear sides in locations not far below the block 85 and two others being arranged similarly to engage it in locations farther downwardly on the member. The tubular member is held against rotation about its own axis by a block 92 mounted to turn on a stud 94 carried by the member and movable along an upwardly and downwardly extending guideway 96 in the casting 93.

Figure 4:
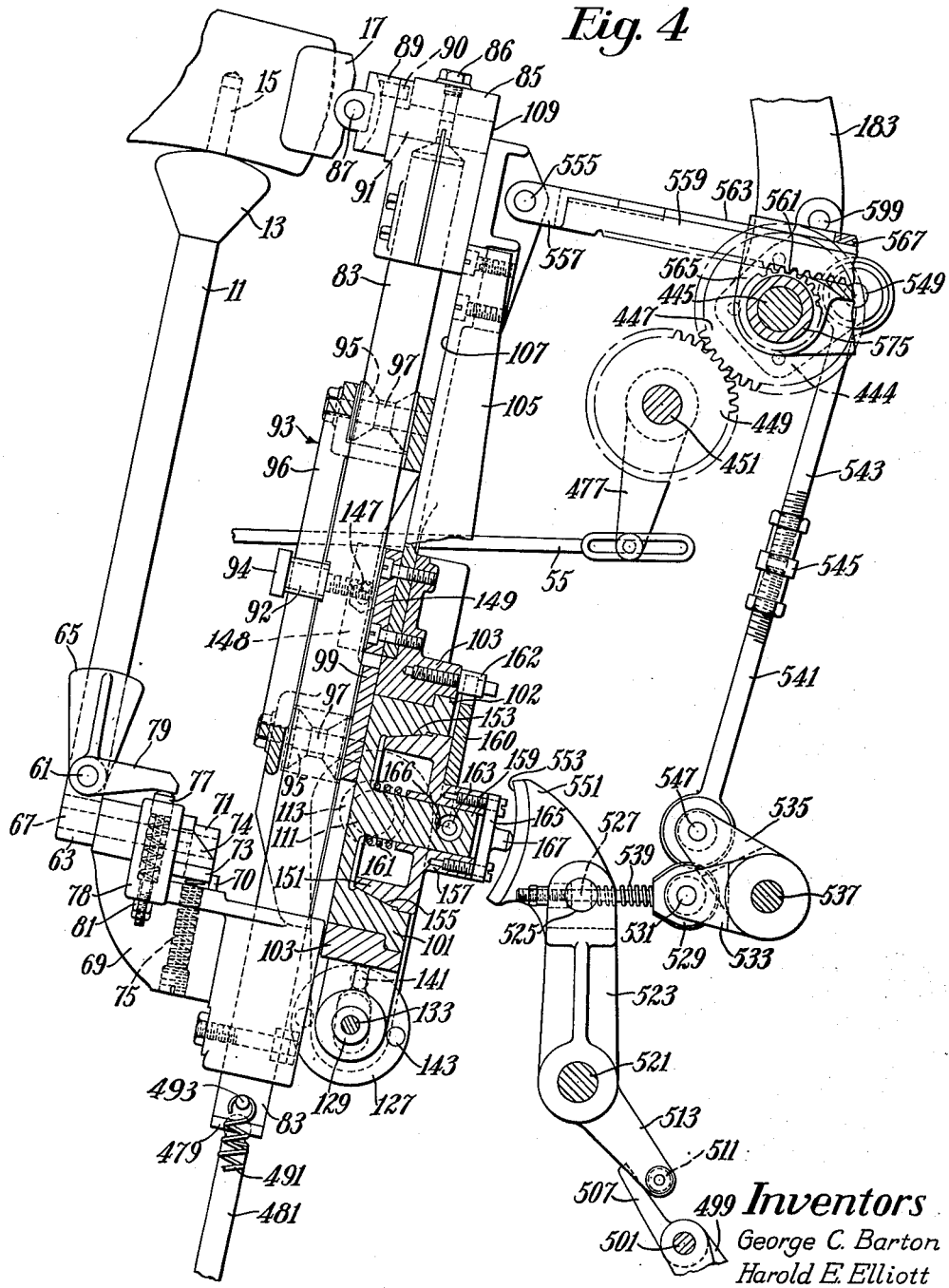
Fig. 4 is a view of portions of the machine partly in front elevation and partly in section on the line IV—IV of Fig. 2.
Figure 5:
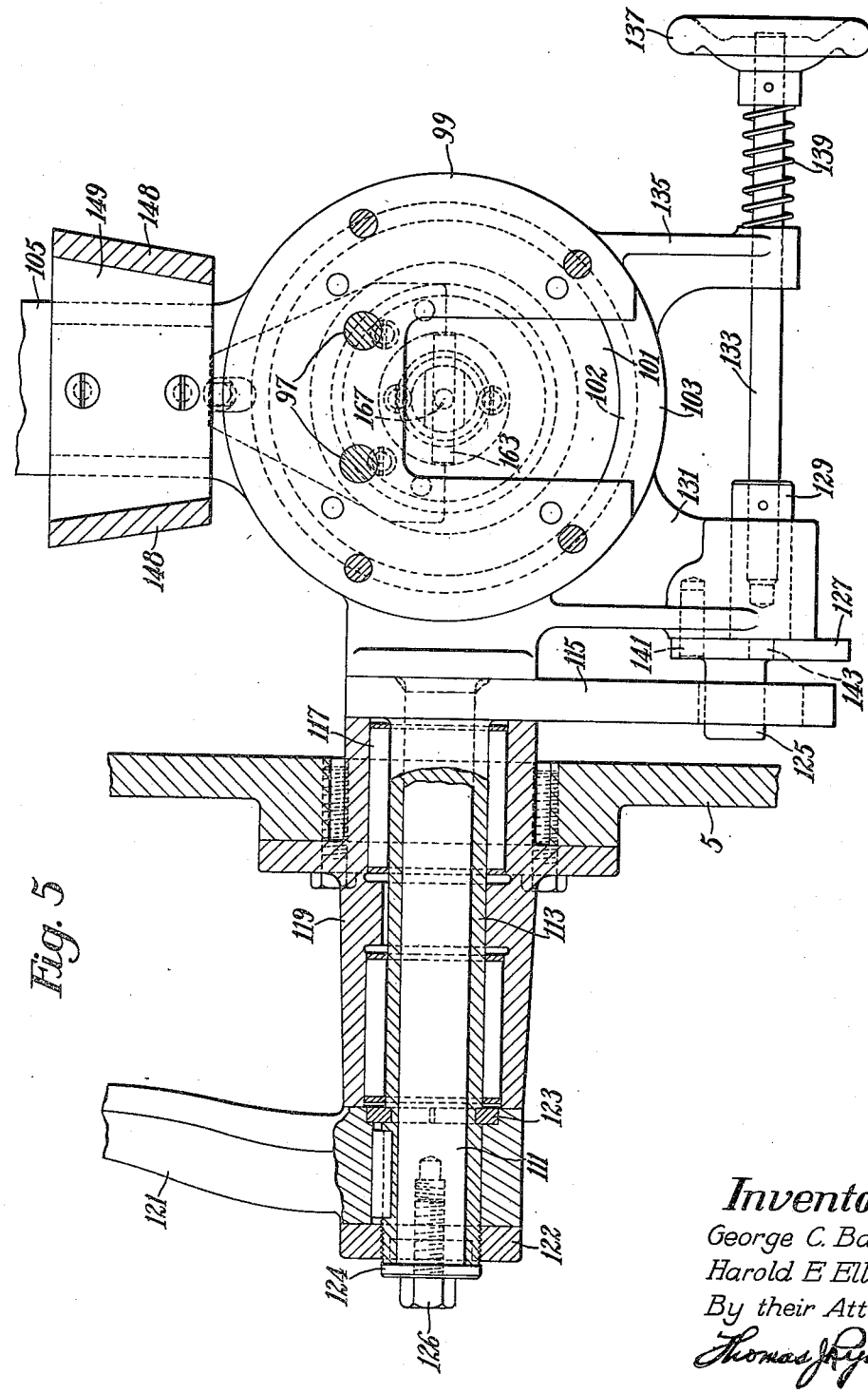
Fig. 5 is a detail view, partly in section and partly in elevation as viewed from the left, of a portion of the structure shown in Figs. 3 and 4.

The lower end portion of the casting 93 is secured to a plate 99 which is fast on a clutch member 101 (Figs. 4 and 5). This clutch member has a cylindrical outer face with a flange 102 thereon, and it is arranged to turn in a bearing bracket 103 about an axis extending lengthwise of the shoe. The plate 99 and the flange 102 serve by engagement with the bracket 103 to hold the clutch member against movement lengthwise of the above axis. Secured to the bracket 103 is an upwardly extending thrust member 105 provided with a flat machined surface 107 in engagement with a flat machined surface 109 on the block 85 which carries the heel rest. It is, therefore, by engagement of the thrust member 105 with the block 85 that the heel rest is forced against the shoe.

The bearing bracket 103 is pivotally mounted for movement about an axis extending widthwise of the shoe and for this purpose is provided with a stem 111 (Fig. 5) extending rearwardly therefrom within a sleeve 113 the front end of which has integral therewith a downwardly extending arm 115. The sleeve 113 is mounted on roller bearings 117 located in a housing which forms part of a bearing bracket 119 (see also Fig. 2) secured to the partition 5 of the machine frame. The rear end portion of the sleeve 113 has keyed thereto an upwardly extending operating arm 121, see Fig. 3, controlled as hereinafter described, and this arm is retained on the sleeve by a nut 122 threaded on the sleeve and clamping the hub of the arm against a split washer 123 mounted in a peripheral recess in the sleeve. The stem 111 is retained in the sleeve 113 by a washer 124 secured on the rear end of the stem by a screw 126.

The lower end portion of the arm 115 (Fig. 5) has a slot extending lengthwise thereof to receive a pin 125 extending rearwardly from a disk 127 on which the pin is eccentrically arranged. The disk 127 has a forwardly extending stem 129 rotatable in a bore formed in a lug 131 extending downwardly from the bearing bracket 103. The stem 129 has secured therein the rear end of a rod 133 extending forwardly through a second lug 135 on the bracket 103 and having on its front end a hand wheel 137 for turning it. Mounted between the hand wheel and the lug 135 is a compression spring 139 which tends to move the rod 133 and the disk 127 forwardly and holds these parts normally, with respect to rotation, in a position determined by a pin 141 extending rearwardly from the lug 131 into one or another of three holes 143 in the disk. By turning the rod 133, after moving it rearwardly against the resistance of the spring 139 to disconnect the disk 127 from the pin 141, the bearing bracket 103 may be swung about the axis of its stem 111 to adjust the heel rest 17 preliminarily lengthwise of a shoe as required by shoes differing substantially in length. It will be understood that when such an adjustment is made the arms 115 and 121 are stationary, the adjustment resulting from the engagement of the eccentric pin 125 with the arm 115. After the adjustment the spring 139 is permitted to return the rod 133, the pin 141 entering the appropriate hole in the disk 127.

Figure 1:
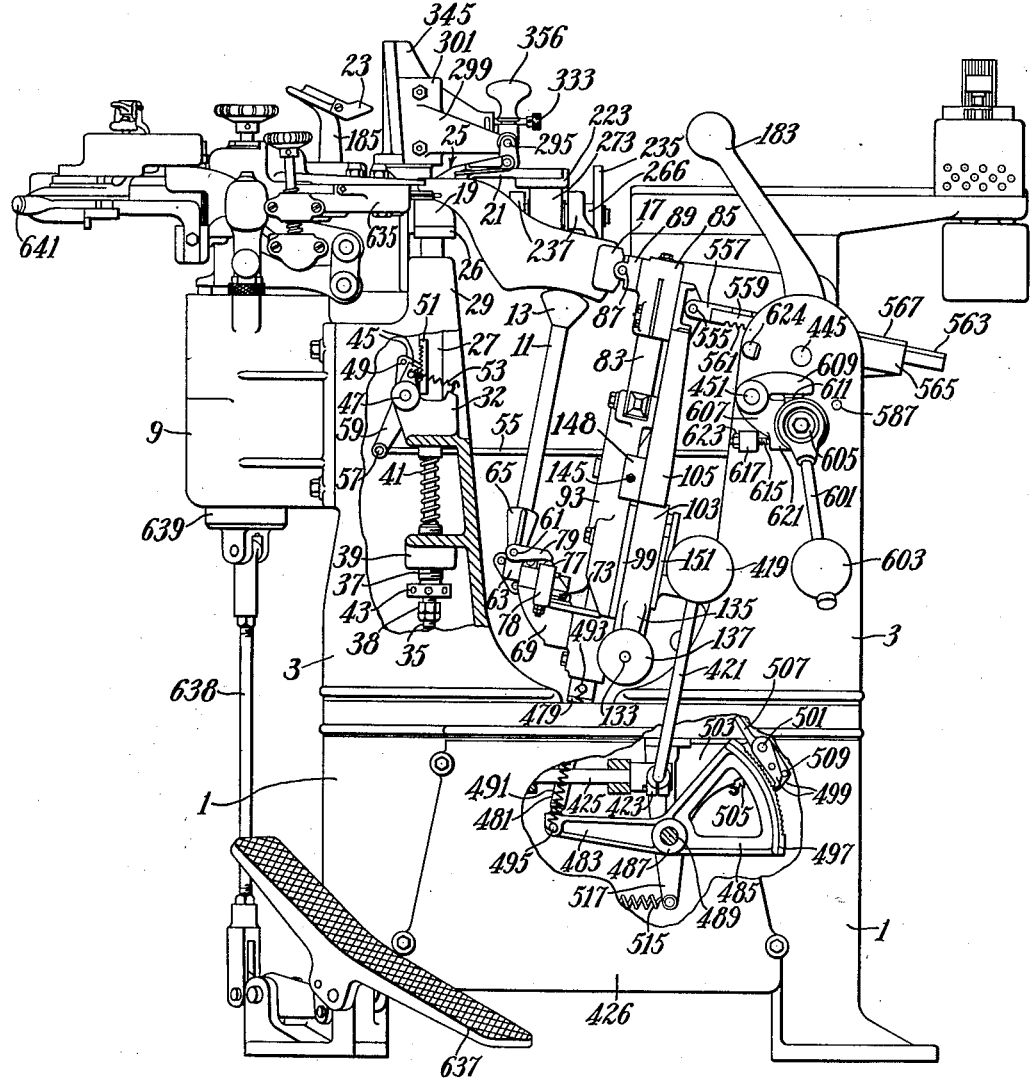
Fig. 1 is a view in front elevation of the machine in which the invention is herein shown as embodied, with portions of the frame broken away and with the parts in the positions which they occupy when a shoe is supported in position for the toe-lasting operation.
Figure 2:
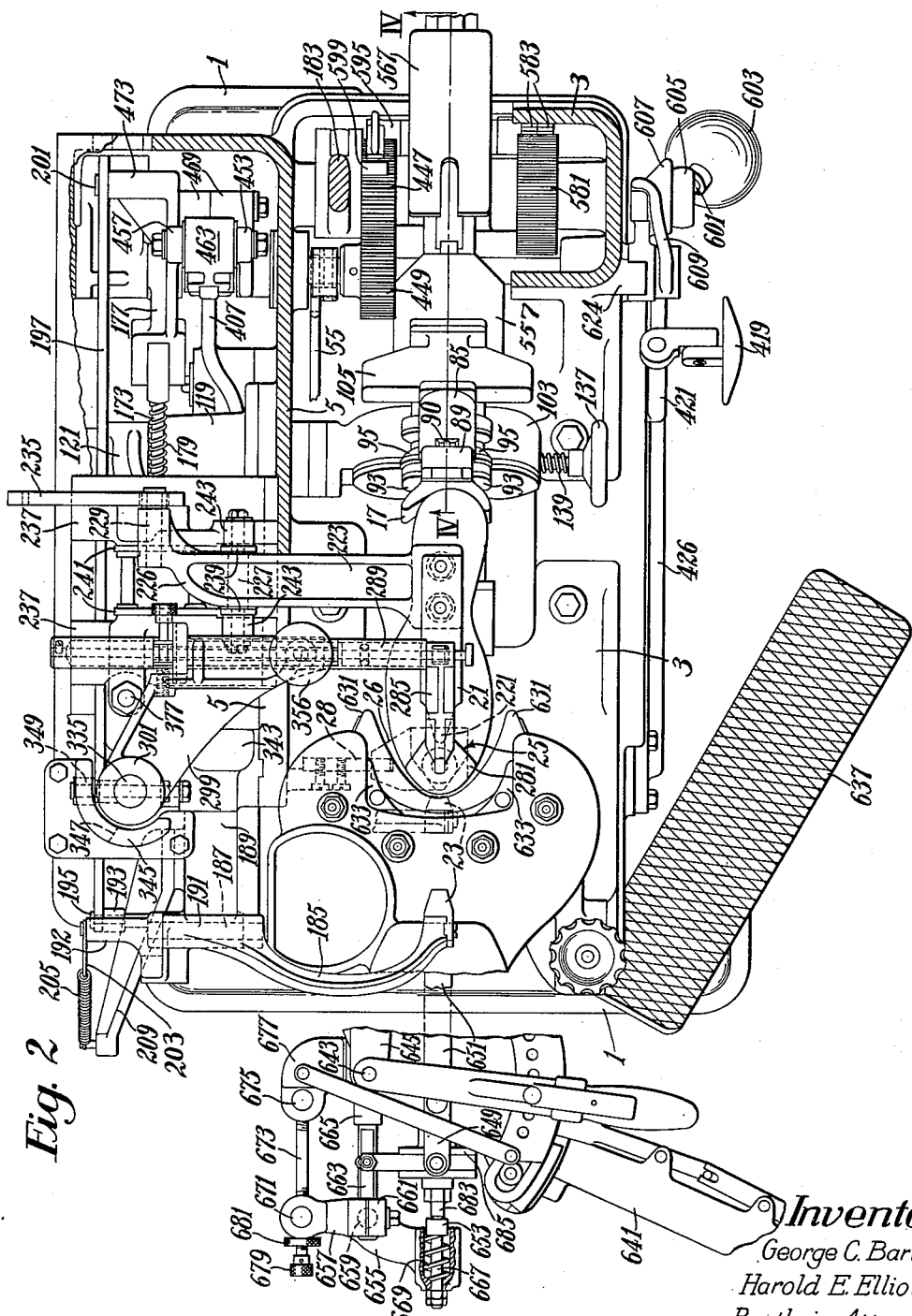
Fig. 2 is a plan view of the machine with parts broken away.

Initially the casting 93, carrying the tubular member 83 which supports the heel rest and the post 11, may swing in directions widthwise of the shoe relatively to the bearing bracket 103 about the axis of the clutch member 101. The heel rest and the post, therefore, may swing as a unit about this axis. Such movement of the casting 93 is limited by engagement thereof with front and rear stop screws 145, 147 mounted in lugs 148 formed on a bracket 149 secured to the thrust member 105 (Figs. 1, 4 and 5). This permits the heel rest to assume the proper position in accordance with the amount of "swing" of the last. To secure the casting 93 thereafter against any such swinging movement, there is provided a clutch member 151 (Fig. 4) having an external conical clutch face 153 arranged to engage a corresponding internal clutch face 155 on the clutch member 101 which is fixed relatively to the casting 93. The clutch member 151 has a hub portion 157 freely mounted on a stem 159 extending from the hub of the clutch member 101, the member 151 being held against rotation about the stem 159 by a plate 160 secured thereto and having a bifurcated portion embracing a stud 162 mounted in the bracket 103. A compression spring 161 mounted between the hub portions of the two clutch members normally holds the clutch member 151 in such a position that the clutch faces on the two members are not in clutching engagement with each other. Movement of the clutch member 151 axially of the stem 159 is limited by a pin 163 extending diametrically of the hub portion 157 of this clutch member through a clearance hole 166 in the stem 159. Secured to the hub portion 157 beyond the end of the stem 159 is a cap 165 having a projection 167 centrally thereof. This projection is arranged to be engaged by means hereinafter described for forcing the clutch member 151 against the resistance of the spring 161 into effective engagement with the clutch member 101 and for thereby locking the casting 93 and the heel rest against forward or rearward swinging movement.

Figure 3:
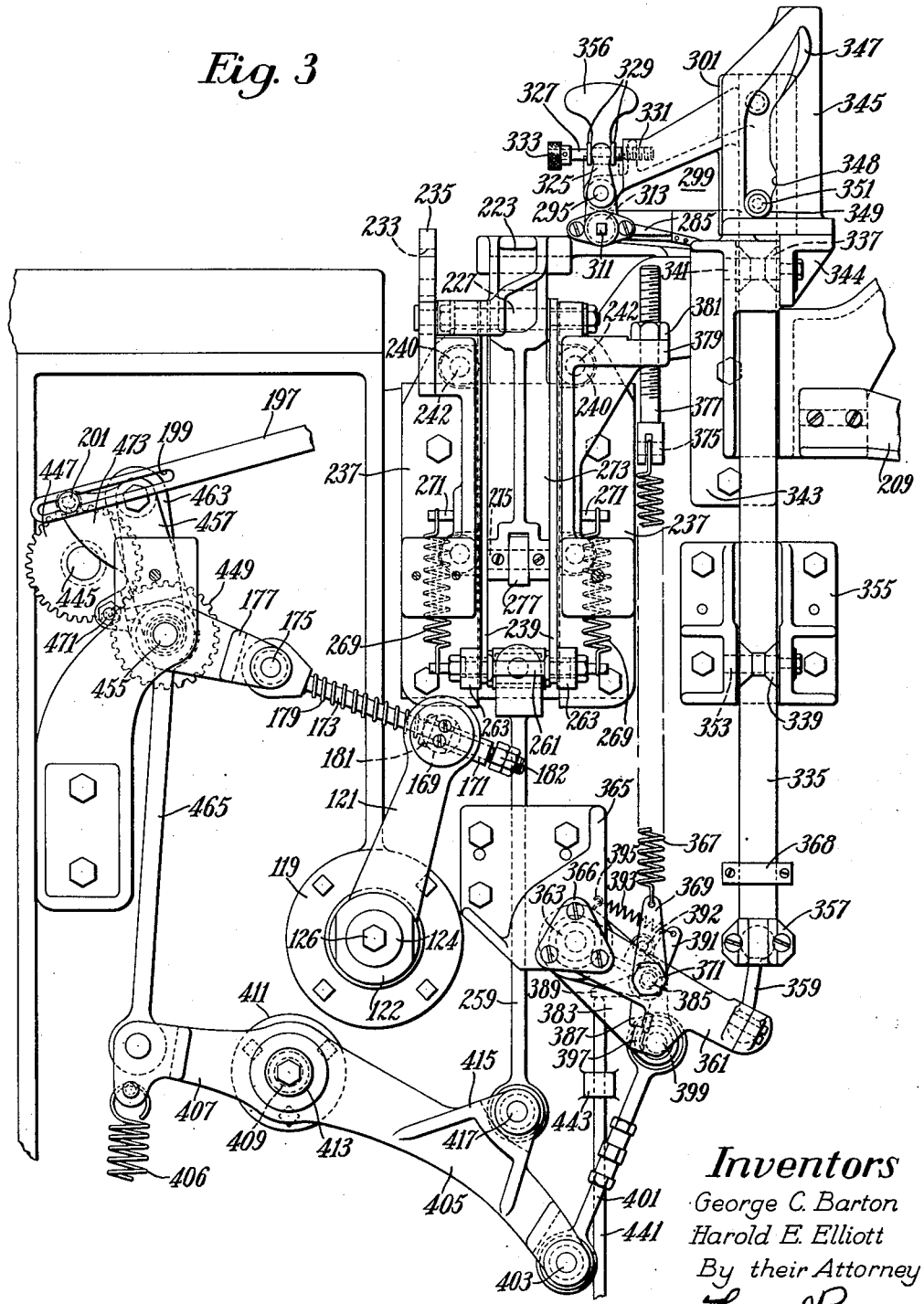
Fig. 3 is a view mainly in rear elevation of portions of the machine.

Movement of the bearing bracket 103 about the axis of its stem 111 to force the heel rest against the shoe is effected by swinging movement of the previously mentioned arm 121 in a clockwise direction with reference to Fig. 3. For this purpose the upper end portion of the arm is bifurcated and has pivotally mounted in its two forks a member 169 provided with a transverse bore in which is slidably mounted, between the forks, a sleeve 171. Extending through this sleeve is a rod 173 one end of which is provided with an enlarged head pivotally connected by a pin 175 to an arm 177. Surrounding the rod 173 between its enlarged head and a flange 181 on one end of the sleeve 171 is a compression spring 179, the flange 181 engaging the member 169. On the opposite end of the rod from its enlarged head is a nut 182 for retaining the rod within the sleeve. The rod 173 and the arm 177 serve as a toggle which, by swinging movement of the arm 177, is moved from a broken position to a straightened position as shown in Fig. 3 to thrust the heel rest against the heel end of the shoe, the spring 179 yielding as required after the engagement of the heel rest with the shoe. The arm 177 is thus swung, through mechanism hereinafter described, by a hand-operated arm 183 (Figs. 1 and 2) which also operates other parts as later described.

In presenting a shoe in position to be operated upon the operator places the heel end of the last on the last pin 15 and swings the post 11 away from the tubular member 83 until the toe end of the shoe is over the toe rest 19. He positions the toe end of the shoe widthwise relatively to the wipers by sight, the wipers being in their lowered positions and their outline corresponding closely to the outline of the edge of the toe portion of the shoe bottom. The operator is assisted in positioning the shoe lengthwise in proper relation to the wipers by the toe-end gage 23 which at this time occupies a predetermined operative position in the machine as indicated by broken lines in Fig. 2.

The toe-end gage 23 consists of a hardened block mounted for adjustment lengthwise of the shoe on an end portion of a curved arm 185 (Figs. 1, 2 and 11) which is secured to a forwardly and rearwardly extending shaft 187 journaled in a bearing in a bracket 189 supported as hereinafter described. The arm 185 has integral therewith a rearwardly extending lug 191 to the rear end of which is secured one arm 192 of a two-armed lever 192, 193 also secured to the shaft 187 behind the bearing in the bracket 189. The arm 193 of the lever is pivotally connected by a stud 195 (Fig. 11) to the left-hand end of a long operating link 197 extending toward the right of the machine (Fig. 2), the right-hand end of this link having therein an elongated slot 199 (Fig. 14) into which extends a pin 201. As hereinafter described, this pin is caused at times to engage the link 197 at the opposite ends of the slot 199 and to move the link in opposite directions to cause the toe-end gage to be moved into and out of operative position. The arm 192 of the lever 192, 193 has one end of a link 203 (Fig. 11) pivotally connected thereto, the other end of this link being connected to one end of a spring 205 the other end of which is connected by a pin 207 to an arm 209 secured to the bracket 189. The operative position of the toe-end gage is determined by engagement of one face of a lug 211 on the arm 193 with one face of a lug 213 on the bracket 189, and when the gage is in operative position the line of force of the spring 205 is below the axis of the shaft 187, so that the spring serves to hold the gage in that position. When the link 197 is moved toward the right in the manner hereinafter explained, the lever 192, 193 and the arm 185 are swung counterclockwise as viewed from the front of the machine until the line of force of the spring 205 crosses the axis of the shaft 187. The spring then swings the lever and the arm still farther in the same direction to carry the gage to its inoperative position in which it is shown in full lines in Fig. 2, this position of the gage being determined by engagement of one face of a lug 215 on the arm with another face of the lug 213 on the bracket 189. It will be understood that as the gage is thus moved by the spring the link 197 moves relatively to the pin 201. When the link 197 is later moved toward the left by the pin 201 it swings the lever 192, 193 and the arm 185 clockwise until the line of force of the spring 205 again crosses the axis of the shaft 187, whereupon the spring completes the movement of the toe-end gage to its operative position.

Figure 6:
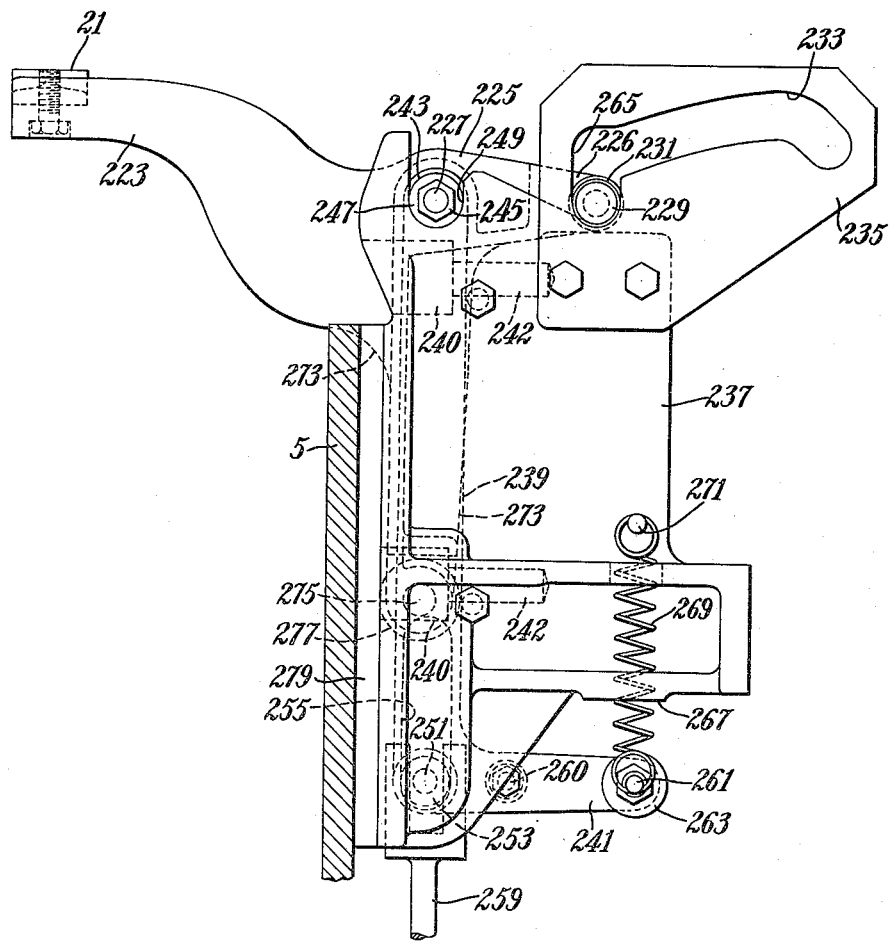
Fig. 6 is a view mainly in right-hand side elevation of parts associated with a shoe-bottom rest included in the machine.

For determining the position of the bottom of the shoe heightwise regardless of its size or of the thickness of the shoe materials the machine is provided with the previously mentioned shoe-bottom rest 21. This shoe-bottom rest comprises a plate which is generally rectangular in plan (Fig. 2) but has a projection 221 extending toward the toe end of the shoe and also has on its lower face three downwardly extending insole-engaging projections (not shown). The shoe-bottom rest is secured to the front end of a forwardly extending arm 223 of a three-armed lever 225 (Fig. 6) which is pivotally mounted on a pin 227 and has a rearwardly extending arm 226. The rear end of the arm 226 is provided with a stud 229 on which is mounted a roll 231 lying within a cam track 233 formed in a plate 235 (see also Fig. 3), this plate being secured to one of two brackets 237 fast on the frame and spaced apart widthwise of the machine. The pin 227 has mounted thereon at opposite sides of the lever 225 the upper end portions of upwardly extending arms 239 of bell-crank levers 239, 241, the arms 241 of these levers extending toward the rear of the machine. A third arm 273 of the three-armed lever 225 extends downwardly and is provided in a bifurcated lower end thereof with a pin 275 on which is mounted a roll 277. This roll is arranged to bear against a rear vertical face of a plate 279 secured between the brackets 237 and the partition 5 of the frame and to be held against the plate as the pressure of the shoe on the shoe-bottom rest tends to swing the lever 225 in a clockwise direction with reference to Fig. 6 about the pin 227. The ends of the pin 227 have thereon rolls 243 retained on the pin by nuts 245 and washers 247. When the shoe-bottom rest is in operative position the rolls 243 lie in slots 249 formed in upper end portions of the brackets 237. The bell-crank levers 239, 241 are fulcrumed on a pin 251 which has thereon rolls 253 lying in vertical slots 255 in the lower end portions of the brackets 237. The arms 239 of these levers are held in spaced relation by shoulders formed on pins 260 and 261 extending between the arms 241. The pin 251 has connected thereto, in a location between the bell-crank levers, the upper end of an operating rod 259. The arms 239 are guided in their upward and downward movements by rolls 240 (Figs. 3 and 6) mounted on pins 242 in the brackets 237. The end portions of the pin 261 have mounted thereon rolls 263. When the shoe-bottom rest is in operative position the rolls 243 are at the lower ends of the slot 249, the roll 231 is at the lower end of a downturned portion 265 of the cam track 233, the rolls 253 are at the lower ends of the slots 255 and the rolls 263 are spaced somewhat below lower faces 267 on the brackets 237. In releasing the shoe after the toe-lasting operation the rod 259 is moved upwardly to raise bodily the bell-crank levers 239, 241 until the rolls 243 reach the upper ends of the slots 249, the roll 231 reaches the upper end of the portion 265 of the cam track 233 and the rolls 263 on the arms 241 engage the faces 267 on the brackets 237. In this manner the shoe-bottom-rest is moved vertically upward away from the shoe. Further upward movement of the rod 259 thereafter causes the bell-crank levers 239, 241 to swing about the axis of the pin 251 as this pin is moved farther upwardly, since the rolls 263 are in engagement with the faces 267, and accordingly the arm 223 and the shoe-bottom-rest are carried bodily rearward and slightly farther upward to inoperative positions, the cam track 233 guiding the lever 225 in this movement. Springs 269 connected to the pin 261 and to pins 271 on the brackets 237 tend to hold the rolls 263 against the faces 267 and therefore cause the bell-crank levers 239, 241 to swing reversely when the rod 259 is moved downwardly as hereinafter described to carry the shoe-bottom-rest toward operative position. Accordingly, the shoe-bottom-rest is carried first to a position directly over the shoe, after which it is moved vertically downward into engagement with the shoe. Continued downward movement thereof forces the toe end of the shoe and the toe rest 19 downwardly against the resistance of the spring 41. Just prior to the completion of the downward movement of the shoe-bottom-rest the toe rest is locked against further downward movement by the pawls 45, and accordingly the final portion of the downward movement of the shoe-bottom-rest squeezes the toe-end portion of the shoe against the rubber toe rest and positions the bottom of the forepart of the shoe at a height determined irrespective of the size of the shoe and the thickness of the shoe materials.

Figure 7:
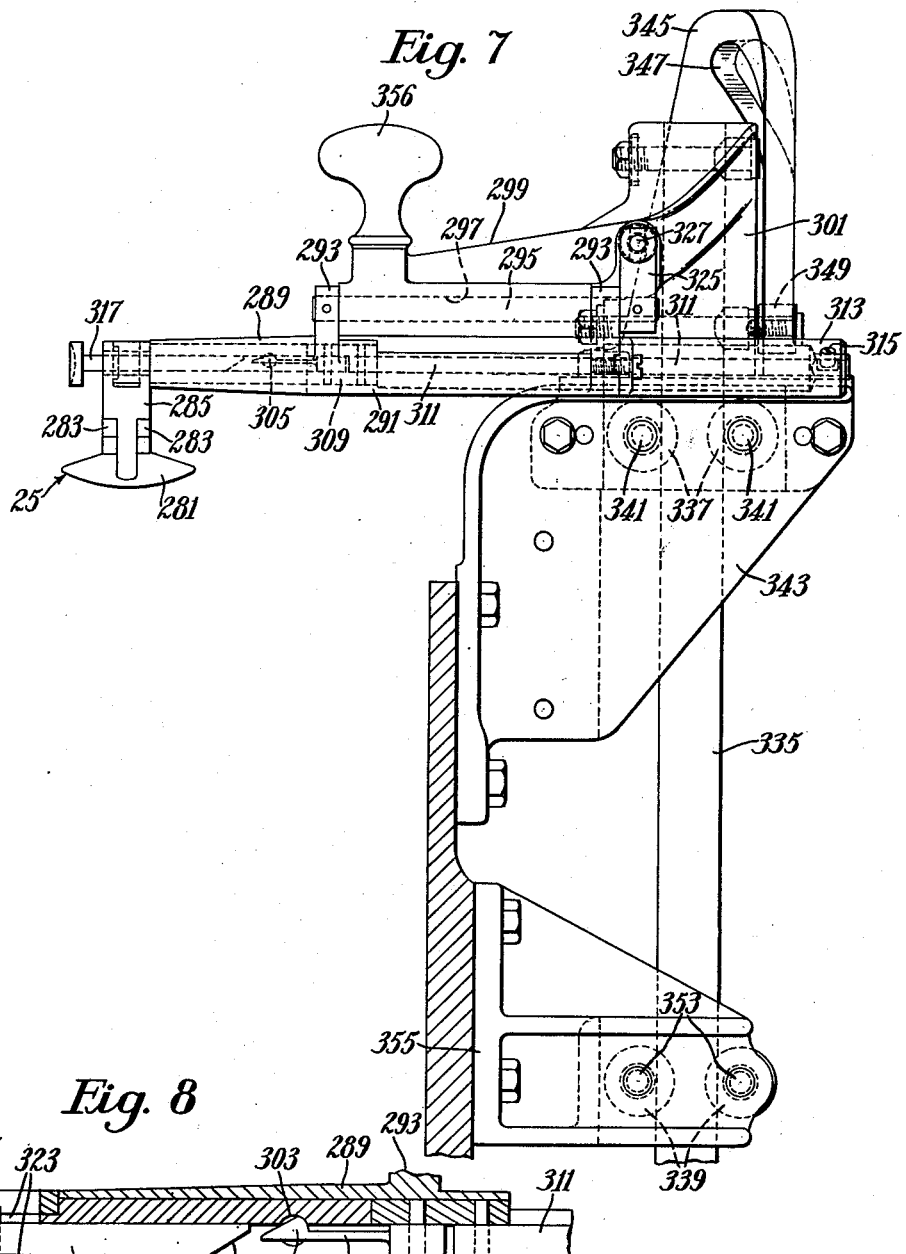
Fig. 7 is a view mainly in right-hand side elevation of parts associated with an insole edge holddown also included in the machine.
Figure 8:
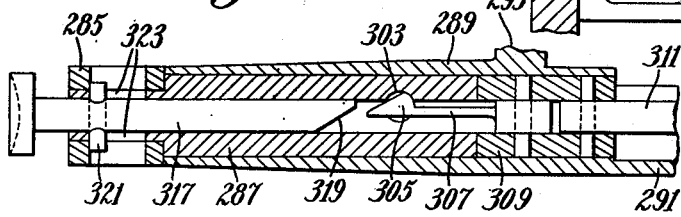
Fig. 8 is a view in vertical section of a portion of the structure shown in Fig. 7.

To insure that the marginal portion of the toe end of the insole will be held down on the last and prevented from buckling during the overwiping action of the wipers, and also to prevent engagement of the margin of the upper with the insole when the wipers first wipe it inwardly, the previously mentioned insole edge holddown 25 is provided. This holddown consists of a comparatively thin plate-like member 281 of spring steel (Figs. 2 and 7) the outline of which in plan corresponds approximately to that of the toe-end portion of an insole. The member 281 is also somewhat arched upwardly to insure that its edge portion will effectively engage the insole. Formed integral with it are upwardly extending lugs 283 secured to an end portion of an arm 285. This arm has extending rearwardly therefrom (Fig. 8) a tubular stem 287 mounted in a bore formed in a sleeve portion 289 of a carrier 291. The carrier has upwardly extending parallel arms 293 pinned to the opposite end portions of a shaft 295 which is rotatable in a bearing 297 formed in an arm 299 extending outwardly from a hub 301. In order that the holddown member 281 may be quickly removed from the machine and replaced by another of a somewhat different shape, the tubular stem 287 has in its rear-end portion a notch 303 into which is arranged to extend a latch 305 formed on a resilient arm 307 which is secured in a bushing 309. This bushing is mounted for turning movement in the rear-end portion of the sleeve 289 and is secured to the front end of a square-sectioned resilient torsion bar 311 which extends rearwardly into a bore in a sleeve-like extension 313 secured to a rear portion of the carrier 291 in axial alinement with the sleeve portion 289 of the carrier. The torsion bar 311 is secured at its rear end in the extension 313 by a setscrew 315 (Fig. 7). The torsion bar controls the edge holddown member 281 in such manner as to permit it to yield upon engagement with the insole.

To release the stem 287 and the arm 285 from the latch 305, a plunger 317 having a wedge face 319 is mounted within the stem. This plunger extends outwardly beyond the front end of the stem and has a head on its front end by which it may be moved inwardly to cause its wedge face 319 to engage an inclined face on the latch 305 and thus to withdraw the latch from the notch 303. The holddown member 281, together with the arm 285 and the stem 287, may then be removed from the machine. Axial movement of the plunger 317 is limited by a transverse pin 321 which extends through it into elongated slots 323 in the stem 287. The pin 321 serves also to position the plunger properly with respect to turning movement in the stem.

Pinned to the shaft 295 at its rear end is an upwardly extending arm 325 (Figs. 3 and 7) the upper end of which is bifurcated to receive between its forks an adjusting spindle 327 having thereon flanges 329 in engagement respectively with the opposite sides of the arm. The spindle is threaded in an upstanding lug 331 on the arm 299 and has a knob 333 on its outer end for turning it. By rotation of the spindle the arm 325 is swung to turn the shaft 295 in one direction or the other and thereby to swing the carrier 291 to adjust the holddown member 281 lengthwise of the shoe. This adjustment also varies somewhat the position of the member 281 heightwise of the shoe relatively to the arm 299 and therefore varies the pressure which it applies to the marginal portion of the insole.

The hub 301, from which the arm 299 extends, is secured to the upper end portion of a vertical tubular post 335 which is mounted for downward and upward movements and for turning movements. For this purpose the post is positioned between an upper pair of rolls 337 and a lower pair of rolls 339. The rolls 337 are freely rotatable on pins 341 extending between a bracket 343 secured to the rear of the partition 5 and another bracket 344 secured to the bracket 343, the bracket 343 having bolted thereto the previously mentioned bracket 189 associated with the mechanism for operating the toe-end gage. The lower rolls 339 are rotatable on studs 353 mounted in a bracket 355 secured to the partition 5.

For controlling turning movements of the post 335 there is provided a cam member 345 bolted to upper faces on the brackets 343 and 344. This cam member has an upstanding partly cylindrical wall in which is formed a cam track 347 provided with a lower substantially vertical portion and an upper spiral-like portion. Within the cam track lies a roll 349 mounted on a stud 351 extending outwardly from the hub 301 of the arm 299. By the action of the cam track, therefore, the insole edge holddown member 281, in response to upward movement of the post 335, is swung in a counterclockwise direction as viewed from above toward the rear of the machine to an inoperative position well out of the operator's way. Movement of the member 281 from that position to its operative position may be effected, as an incident to what may be termed the jacking of the shoe, by mechanism about to be described for imparting downward movement to the post 335. Alternatively, as will be described, this mechanism may be so adjusted that the holddown member must be moved to its operative position by the operator after the jacking of the shoe, a handle 356 being mounted on the arm 299 for this purpose.

Figure 9:
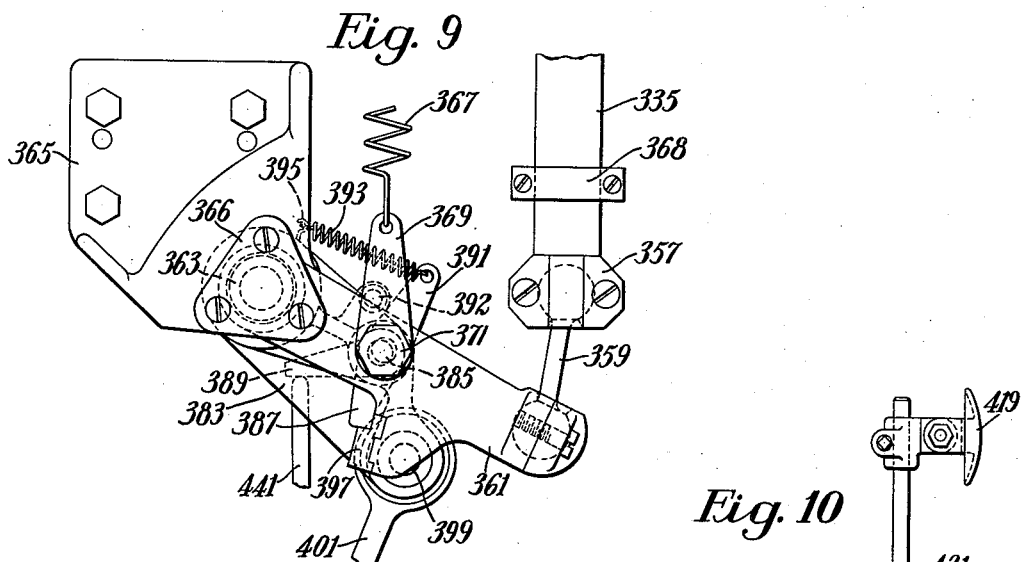
Fig. 9 is a view in rear elevation of operating means associated with the insole edge holddown.

Secured to the lower end of the post 335 is a two-part bearing member 357 provided with a partly spherical bearing in which is mounted one end of a dumbbell-shaped link 359 (Figs. 3 and 9), the other end of this link being mounted in a bearing formed in an end of an arm 361. This arm is mounted for free swinging movement on a shaft 363 journaled at one end in a bearing in the partition 5 and at the other end in a bearing in a bracket 365 secured to the rear of the partition, the shaft being held in place by plates 366 secured to the bracket and the partition. For moving the post 335 upwardly a spring 367 is connected to a plate 369 pivotally mounted on a pin 371 on the arm 361 and to a pin 375 mounted in the lower end of a tension-adjusting member 377. This member has a threaded stem extending upwardly through a clearance hole in a lug 379 on the right-hand bracket 237, as viewed in Fig. 3, and a nut 381 threaded on the stem engages the upper face of the lug. By turning the nut, therefore, the tension of the spring 367 may be adjusted. Upward movement of the post 335 is limited by engagement of a stop collar 368 fast thereon with a lower face of the bracket 355. For moving the arm 361 in the direction to lower the post 335 against the resistance of the spring 367, there is provided a lever 383 fulcrumed on the shaft 363 and having parallel arms through bearings in which extends a spindle 385. This spindle has a pawl 387 secured on one end thereof and a trip lever having two arms 389, 391 secured on its other end. Connected to one end of the arm 391 is a spring 393 which is connected at its other end to a hook 395 mounted on a hub portion of the lever 383. This spring tends to swing the pawl 387 in a counterclockwise direction with reference to Figs. 3 and 9 and positions it normally above a hardened block 397 secured to the arm 361, such movement of the pawl being limited by engagement of the arm 391 with a pin 392 mounted in a lug on the lever 383. When this lever, therefore, is swung in a clockwise direction with reference to Figs. 3 and 9 about the shaft 363, the pawl 387 transmits similar movement to the arm 361 to lower the post 335 and thus to carry the insole edge holddown to operative position. The lever 383 is connected by means of a stud 399 to the upper end of a composite link 401 the length of which may be adjusted by a turnbuckle connecting its opposite end portions.

The lower end of the link 401 is connected by a stud 403 to one end of an operating lever having two arms 405, 407. This lever is fulcrumed between its opposite ends on a roller bearing mounted on a fulcrum pin 409, this pin being secured to the partition 5 by bolts extending through a flange 411 on the pin into the partition. The lever is retained on the pin by means of an end plate 413 secured to the pin. On the arm 405 of the lever is formed a bifurcated lug 415 to which is connected by a pin 417 the lower end of the previously mentioned rod 259 for operating the shoe-bottom rest. Accordingly, as the lever 405, 407 is swung clockwise, as viewed in Fig. 3, the shoe-bottom rest and the insole edge holddown are both moved to operative positions.

After a shoe has been jacked in position to be operated upon by the wipers and after the wipers have been operated to wipe the marginal portion of the toe end of the upper inwardly over the edge portion of the insole edge holddown member 281, it is necessary to cause this member to be withdrawn from its operative position, so that the wipers may press the upper into position to adhere to the insole. In order that this may be accomplished while the shoe-bottom rest remains in its operative position, means is provided for swinging the pawl 387 clockwise as viewed in Fig. 3 to carry its lower end away from over the block 397 on the arm 361. This arm will then be moved relatively to the lever 383 in a counterclockwise direction by the spring 367 to raise the post 335. This movement of the post causes the insole edge holddown member 281 to be raised and swung rearwardly to its inoperative position, the pressure of the wipers on the upper being slightly relieved by the operator to permit the holddown member to be withdrawn from beneath the margin of the upper. As the post 335 begins to rise the torsion bar 311 (Fig. 8) tends to cause the arm 285 to swing in a counterclockwise direction as viewed from the front of the machine, and the resilience of the holddown member 281 itself also tends to cause the central portion thereof to arch upwardly and by engagement with the upper materials in front of the wipers to cause the member to be deflected lengthwise of the shoe from beneath the margin of the upper. This causes the post 335 to turn counterclockwise as viewed from above, a recess or offset 348 being provided in the wall of the cam track 347 to permit this movement. When the shoe is later released from the machine and the shoe-bottom rest is returned to its inoperative position by counterclockwise movement of the lever 405, 407, as viewed in Fig. 3, the lever 383 is swung counterclockwise relatively to the arm 361 until the pawl 387 is again positioned above the block 397.

Figure 10:
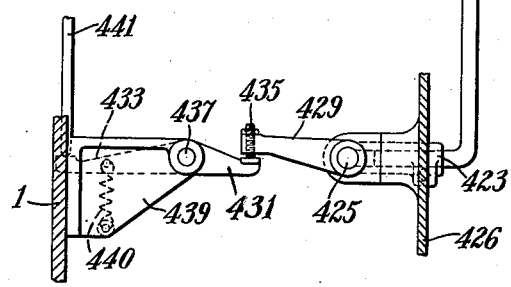
Fig. 10 is a view mainly in left-hand side elevation of tripping means associated with the insole edge holddown.

For disengaging the pawl 387 from the block 397 there is provided a knee pad 419 (Figs. 1, 2 and 10) mounted on the upper end of a rod 421 which has a rearwardly extending lower end portion secured in an arm 423 extending forwardly through a vertical slot (not shown) in a cover plate 426 fast on the base casting. The arm 423 is secured to one end portion of a shaft 425 journaled in bearings on the cover plate 426. Secured to the other end of the shaft 425 is a rearwardly extending arm 429 the rear end of which overlies the front end portion of one arm 431 of a two-armed lever 431, 433, the arm 429 having therein a setscrew 435 which engages the upper face of the arm 431. The lever 431, 433 is freely pivoted on a stud 437 secured in a bracket 439 which is bolted to one of the side members 1 of the base casting. The upper face of the rear end portion of the arm 433 is hollowed out to receive the lower end of a trip rod 441 which extends upwardly through a vertical bore in a lug 443 (Fig. 3) formed on the rear of the partition 5 of the frame. The upper end of the trip rod 441, when the insole edge holddown is in operative position, is located just below the arm 389 of the lever 389, 391, as shown in Fig. 3. Rearward movement of the knee pad 419, therefore, causes upward movement of the trip rod to swing the lever 389, 391 and thereby to release the arm 361. A spring 440 (Fig. 10) connected to pins mounted respectively on the arm 433 and the bracket 439 tends to swing the knee pad forwardly, this movement of the pad being limited by engagement of the arm 423 with the cover plate 426 at the lower end of the slot in the cover plate.

The insole edge holddown member 281 may conveniently be moved into operative position as above described simultaneously with the movement of the shoe-bottom rest when the machine is to operate on a shoe the lining and the toe box of which have been previously trimmed as desired preparatory to the toe-lasting operation, cement also having been applied to the margin of the upper and to the insole. In many cases, however, it is necessary to perform the trimming and cement-applying operations by hand after the shoe has been secured in place by the shoe-bottom rest, and it is not convenient for the edge holddown member to be in operative position when these operations are performed. In order to prevent this it is only necessary for the operator to shorten slightly the composite link 401, so that when the lever 383 is swung in a counterclockwise direction with reference to Fig. 3 in the return of the parts to starting positions the pawl 387 will not be carried upwardly far enough to be positioned over the block 397. In operating, therefore, on a shoe the operator will use the handle 356 at the proper time to swing the edge holddown member into position over the shoe and to move it downwardly in the path determined by the cam track 347, thus causing the arm 361 to swing clockwise with reference to Fig. 3 until the pawl 387 rides over the block 397 to retain the edge holddown member in operative position. Thereafter the member will be released and moved to inoperative position at the required time in response to movement of the knee pad 419 in the manner previously described.

Figure 12:
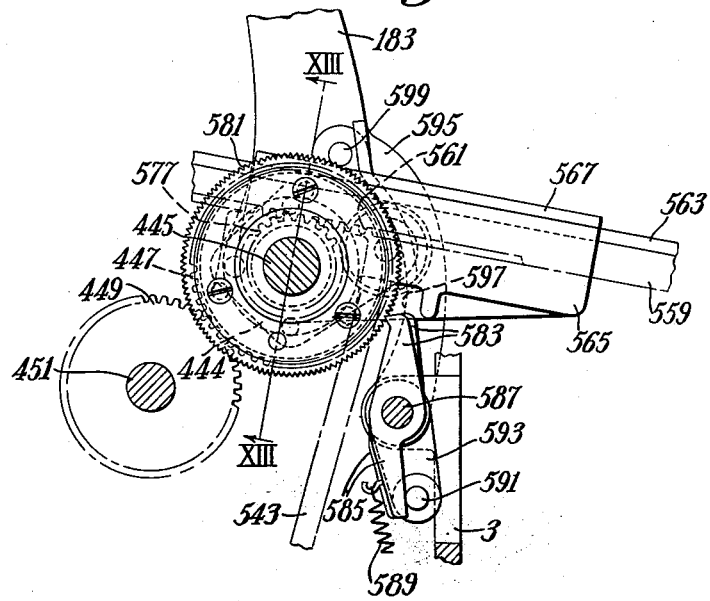
Fig. 12 is a detail view in front elevation, with parts broken away, of mechanism associated with an operator-controlled arm by which parts of the machine are operated.
Figure 13:
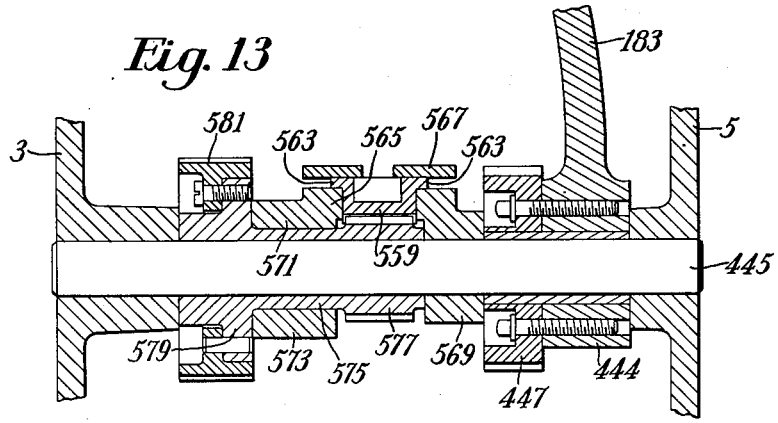
Fig. 13 is a section on the line XIII—XIII of Fig. 12.

The manner in which the various mechanisms hereinbefore described are connected to and operated by the arm 183 will now be more particularly explained. This arm has a hub 444 (Fig. 13) mounted to turn about a shaft 445 extending forwardly and rearwardly of the machine and mounted on the frame. Secured to the hub of the arm is a gear wheel 447 in mesh with another gear wheel 449 (Figs. 2 and 12) keyed to a shaft 451 which is parallel to the shaft 445 and is journaled in bearings in the frame. The shaft 451 extends through the partition 5 and immediately behind the partition has an arm 453 (Fig. 15) secured thereto. Coaxial with the shaft 451 but spaced somewhat rearwardly therefrom is a stub shaft 455 on which the previously mentioned arm 177 (Fig. 3) is pivotally mounted. Formed integral with this arm is an arm 457 which is parallel to the arm 453. Outer end portions of the arms 453 and 457 are connected together by a stud 461 which is secured to the arms, and on this stud is pivotally mounted, between the arms, a downwardly extending link 463. The lower end of this link is bifurcated and is pivotally connected to the upper end of a downwardly extending connecting rod 465 by means of a pin 467, the rod 465 being pivotally connected at its lower end to the arm 407 of the lever 405, 407 for operating this lever. When the arm 183 is swung in a counterclockwise direction from an initial position to the position in which it is shown in Fig. 1, the arms 453, 457 are swung counterclockwise, as viewed in Figs. 3 and 14, from initial positions in which an inverted toggle formed by these arms and the link 463 is in a broken condition to a position in which this toggle has moved very slightly past its straightened condition, this movement of the toggle being limited by engagement of an edge of the link 463 with stop faces formed on lugs 469 (Fig. 15) extending from the arms 453, 457. The parts will then remain in these positions until the toggle is returned to its initial position. The lugs 469 extend toward each other into abutting relation and thereby serve to space the arms 453, 457 from each other. Extending forwardly and rearwardly through bores in the lugs 469 is a stud 471 (Fig. 14).

When the inverted toggle above referred to has been moved slightly past its straightened condition as above described, the toggle formed by the arm 177 and the rod 173 is in straightened condition as shown in Figs. 3 and 14. The heel rest, therefore, is in engagement with the heel end of the shoe and, the rod 465 having been raised by the straightening of the inverted toggle, the lever 405, 407 will have been swung clockwise, as viewed in Fig. 3, to move the shoe bottom rest and the insole edge holddown (if the link 401 is appropriately adjusted) to their operative positions.

The arm 457 has integral therewith an outwardly extending lug 473 which carries the previously mentioned pin 201 lying in the slot 199 in the link 197. As the arm is swung counter-clockwise with reference to Fig. 3, as above described, the pin 201 engages the link 197 at the outer end of the slot 199 and moves the link in the direction to cause the toe end gage 23 to be moved to its inoperative position. The pin and slot provide for such lost motion that only a late portion of the movement of the arm 457 is effective to move the toe end gage, the gage remaining in operative position until the jacking of the shoe has been substantially completed.

For controlling the link 55 (Fig. 1) associated with the pawls 45 which lock the toe rest 19 against downward movement the right-hand end of the link is connected by a pin 475 (Fig. 14), which extends into a slot in the link, to an arm 477 (Fig. 15) secured to the shaft 451. Prior to the jacking of a shoe in the machine the pawls 45 are held out of engagement with the rack 51 by engagement of the pin 475 with the link 55 at the left-hand end of the slot in the link, as the parts are viewed in Fig. 14, and only when the inverted toggle provided by the arms 453, 457 and the link 463 has been nearly straightened are the pawls permitted actually to engage the rack. The slot in the link thereafter permits movement of the arm 477 to continue as the toggle completes its movement to the position determined by engagement of the link 463 with the lugs 469.

Near the end of the operation of jacking the shoe in the machine the heel rest and the last pin are positively locked against downward movement. For this purpose the lower end of the tubular member 83 has thereon a bearing member 479 (Figs. 1 and 4) provided with a recess in which is seated the rounded upper end of a rod 481 the lower rounded end of which engages a bearing surface in the outer end of an arm 483, this arm being formed integral with a segmental member 485 provided with a boss 487 by which it is pivotally mounted on a shaft 489. Springs 491 connected to pins 493 in the member 83 and pins 495 in the end of the arm 483 keep the rod 481 in abutting relation to the bearing surfaces of the member 479 and the arm 483. A peripheral portion of the segmental member 485 has secured thereto an arcuate member 497 with ratchet teeth thereon, and to lock the member 83 against downward movement a pair of staggered pawls 499 mounted on a shaft 501, which is supported by two brackets 503 fast on the frame, are caused at the proper time to engage the teeth on the member 497. The shaft 489 also is supported by the brackets 503. The pawls 499 are urged in the direction to engage the ratchet teeth by springs 505 connected to them and to hooks secured to the brackets 503. The foremost pawl is fast on the shaft 501 and the other is freely pivoted on the shaft but has a pin 509 extending forwardly adjacent to the outer end of the foremost pawl. An arm 507 fast on the shaft 501 is arranged to be engaged by a pin 511 (Fig. 4) extending rearwardly from an arm 513 before a shoe is jacked in the machine to hold the pawls out of engagement with the ratchet teeth, so that the heel rest and the last pin may be moved downwardly together. Such downward movement of the heel rest and the last pin takes place against the resistance of a spring 515 connected to an arm 517 extending downwardly from the shaft 489 and to a lug on the frame.

The arm 513 is secured to a shaft 521 journaled in bearings in the frame, and to this shaft is also secured an upwardly extending arm 523 the upper end of which is bifurcated and has a trunnion pin 525 mounted to turn therein. Through a transverse bore in this pin extends a rod 527 having on one end an enlarged head 529 and on its other end screw threads on which are mounted a nut and a lock nut. Surrounding the rod between the trunnion pin 525 and the head 529 is a spring 539. Extending through the head 529 is a pin 531 by which the rod 527 is pivotally connected to an arm 533 of a bell-crank lever having another arm 535, the rod 527 and the arm 533 forming a toggle. This bell-crank lever is pivotally mounted on a shaft 537 secured in the machine frame. The arm 535 is bifurcated and is pivotally connected by a pivot pin 547 to the lower end portion 541 of a composite link including also an upper portion 543 and a turnbuckle 545 for adjusting the length of the link. The upper portion 543 of the link is connected to the hub 444 of the arm 183 by a pivot pin 549. The arm 523 also carries a member 551 provided with an arcuate face 553 arranged to engage the projection 167 of the member 165 for moving the clutch member 151 into position to lock the member 83 against forward or rearward swinging movement. The construction described is such that when the arm 183 is in its initial position the link 541, 543 is in a lowered position, so that the toggle formed by the rod 527 and the arm 533 is broken in a downward direction. Under these conditions the pawls 499 are out of engagement with the ratchet teeth on the member 497 and the face 553 on the member 551 is clear of the projection 167. The member 83 carrying the heel rest and the last pin is thus free to be moved downwardly and the casting 93 may be swung to carry the heel rest and the last pin forwardly or rearwardly. When the arm 183 is swung in the direction to jack the shoe the link 541, 543 is moved upwardly to straighten the toggle formed by the rod 527 and the arm 533, as shown in Fig. 4, thus releasing the pawls 499 to cause them to lock the member 83 against downward movement and forcing the clutch member 151 into clutching engagement with the member 101 to lock the casting 93 and the member 83 against forward or rearward movement.

For locking the heel rest against reverse movement after it has been moved into shoe-engaging position, the upper end portion of the thrust member 105 has pivotally connected thereto by means of pins 555 a member 557 to which is secured a slide 559. This slide is provided with rack teeth 561 on its lower side and is further provided with ribs 563 (Figs. 12 and 13) mounted in guideways in a guide member 565 having a cover plate 567 thereon. The guide member is provided with a boss 569 free to rotate on the shaft 445. A portion 571 of the guide member, together with a cap 573 thereon, provides a bearing in which is secured a sleeve 575 also freely rotatable on the shaft 445. This sleeve has formed thereon a pinion 577 in mesh with the rack teeth 561 on the slide 559 and is also provided with a flange 579 to which is secured a ratchet wheel 581. For engaging the teeth of this ratchet wheel a pair of staggered pawls 583 provided with tails 585 are freely pivoted on a shaft 587 journaled in bearings in the machine frame. Springs 589 connected to hooks on the tails of these pawls and to the frame tend to swing the pawls into engagement with the teeth on the ratchet wheel. The pawls, however, are held initially out of engagement with these teeth by a pin 591 carried by an arm 593 which is secured to the shaft 587. This shaft also has secured to it another arm 595 provided with an arcuate surface 597 which, until the arm 183 has substantially completed its movement to jack the shoe, is engaged by a pin 599 carried by a lug extending from the hub 444 of the arm 183. As this arm approaches the end of its operative movement the pin 599 rides off the surface 597, thus permitting the arms 593 and 595 to swing counterclockwise with reference to Fig. 12 and accordingly permitting the pawls 583 to be swung by the springs 589 into engagement with the ratchet teeth to lock the heel rest against reverse movement.

To facilitate release of the shoe without the necessity for the operator to move the arm 183 reversely by hand, there is provided a knee-operated rod 601 (Figs. 1 and 2), having a knee pad 603 on its lower end and secured at its upper end, by means of a clamp member 605, to an arm 607 freely pivoted on an end portion of the shaft 451 extending forwardly beyond the front of the machine frame. Secured to this portion of the shaft is an arm 609 arranged to overlie and engage an abutment 611 on the arm 607 when the shaft 451 has been rotated to bring the shoe-engaging instrumentalities into the positions which they occupy when the shoe is jacked in the machine. The position occupied by the arm 607 at this time is determined by a screw 615 adjustably secured by a nut 623 in a lug 617 on the frame, the screw engaging a lug 621 on the arm. By moving the knee pad 603 a short distance toward the right the operator causes the arm 607 to swing the arm 609 and thus to turn the shaft 451 in a counterclockwise direction far enough to break the toggles hereinbefore described through which the heel rest, the shoe-bottom rest and the insole edge holddown are operated, whereupon these parts are returned to their initial positions, their return movements being assisted by a spring 406 (Fig. 3) connected to the arm 407. The counterclockwise movement of the shaft 451 is limited by engagement of the arm 609 with a lug 624 on the frame.

The machine is provided with a pair of toe-embracing wipers 631 (Fig. 2) detachably secured to wiper carriers 633 mounted in a housing 635 (Fig. 1). The wipers are moved upwardly to wipe the upper heightwise of the last by a treadle 637 connected by a link 638 to a cylindrical member 639 which is vertically movable in the casting 9 and supports the housing 635. In these respects the construction shown is substantially like that disclosed in Letters Patent No. 2,097,567. In the machine herein shown, however, manually operated means alone is provided for operating the wipers to wipe the upper inwardly over the insole, the supplemental hydraulically operated means disclosed in the above-mentioned Letters Patent being omitted. The wiper-operating means includes a hand lever 641 having a bifurcated rear end pivotally mounted by means of a stud 643 on a lug 645 projecting from a casting on the frame. The hand lever is connected, by means including a pair of links 649, to an end portion of a wiper-operating rod 651 corresponding to the rod 37 shown in the above-mentioned Letters Patent. Movement of the hand lever toward the left to retract the wipers is yieldably limited by a spring-controlled stop 653, so that when the wipers are retracted to the positions normally determined by this stop they are in such relation to the shoe as to wipe the upper heightwise of the last when they are moved upwardly. The stop 653 is mounted in a recess in an arm 655 of a two-armed lever 655, 657 pivotally mounted between its ends on a vertical stud 659 extending downwardly from a block 661 which is secured to a rectangular bar 663 fixed on a bracket 665. The stop 653 has a stem 667 slidingly mounted in a bore in the arm 655 and surrounded by a spring 669 against the resistance of which the stop is movable relatively to the arm. Threaded on the end of the stem 667 are a nut and a lock nut for limiting movement of the stop by the spring.

The arm 657 is bifurcated at its rear end and has a pin 671 rotatable therein, this pin having a transverse bore in which is threaded a rod 673. The right-hand end portion of this rod is threaded in the reverse direction in a transverse bore in a pin 675 mounted to turn in a bracket 677 secured to the bracket 665. Fast on the outer end of the rod 673 is a knob 679 by which the rod may be turned to adjust the position of the stop 653 by swinging the lever 655, 657. To lock the rod 673 in adjusted position it has threaded thereon a lock nut 681 which engages the arm 657. If the operator should for any reason wish to repeat an upwiping operation on the toe end of the shoe he may swing the hand lever 641 farther to the left against the resistance of the spring 669 and thereby retract and open the wipers to such an extent as to insure that as he lowers them to their initial positions they will not engage the upper.

The manner in which the various shoe-supporting and positioning instrumentalities co-operate in the jacking of a shoe should be clear from the foregoing description. The construction described facilitates the presentation of the shoe in the correct relation to the wipers by affording the operator the opportunity to determine by sight with reference to the wipers when the toe end of the shoe is properly positioned laterally and angularly without hindrance by the shoe-bottom rest, the insole edge holddown and the heel rest which are then in their inoperative positions. Once the shoe has been correctly positioned, these instrumentalities may be quickly moved to their operative positions by means of the hand-operated arm 183, opportunity being afforded, however, for moving the insole edge holddown separately, if desired, by means of the knob 356 in the manner hereinbefore described. The fact that the shoe-bottom rest is always moved down to a predetermined position and therefore always locates the forepart of the shoe bottom at the same height, regardless of variations in the thickness of the upper materials or of the insole and the height of the toe portion of the last, requires that the wipers always be moved upwardly to the same positions prior to the wiping of the upper inwardly over the insole. Furthermore, the insole edge holddown and the means provided for controlling it render the machine suitable for operating either on shoes the linings and toe boxes of which have been pre-trimmed, followed by the application of cement to the uppers and insoles, before the shoes are presented to the machine, or on shoes which are presented before the trimming and cement-applying operations. The insole edge holddown serves to prevent premature adherence of the margin of the upper to the insole and thus enables the operator to perform, if desired, more than one upwiping operation and, it may be, more than one overwiping operation before the margin of the upper is secured finally in lasted position.

Having described the invention, what we claim as new and desire to secure by Letters Patent of the United tates is:

1. In a lasting machine, the combination with toe-lasting means, of means for supporting a shoe on a last bottom upward for the operation of said toe-lasting means thereon, said shoe-supporting means comprising a toe rest arranged to engage the toe end of the shoe underneath and a heel-end support provided with a last pin arranged to extend into the usual spindle hole in the heel end of the last, said toe rest and heel-end support being mounted to move yieldingly downward with the shoe in response to pressure applied on the bottom of the shoe, means for engaging the bottom of the shoe and thus moving it downwardly, and a heel rest movable lengthwise of the shoe into engagement with its heel end and mounted to move downwardly with said heel-end support, said heel-end support and heel rest being mounted to swing as a unit about an axis extending lengthwise of the shoe to different positions for right and left shoes respectively.

2. In a lasting machine, the combination with toe-lasting means, of means for supporting a shoe on a last bottom upward for the operation of said toe-lasting means thereon, said shoe-supporting means comprising a post provided with a last pin arranged to extend into the usual spindle hole in the heel end of the last and mounted to move downwardly with the shoe in response to pressure applied on the bottom of the shoe, and a heel rest movable lengthwise of the shoe into engagement with its heel end and mounted to move downwardly with said post, said post and heel rest being mounted to swing as a unit about an axis extending lengthwise of the shoe to different positions for right and left shoes respectively, and said post being further mounted to swing yieldingly about such an axis relatively to the heel rest.

3. In a lasting machine, the combination with toe-lasting means, of means for supporting a shoe on a last bottom upward for the operation of said toe-lasting means thereon, said shoe-supporting means comprising a post provided with a last pin arranged to extend into the usual spindle hole in the heel end of the last, a heel rest movable lengthwise of the shoe into engagement with its heel end, said post and heel rest being mounted to swing as a unit about an axis extending lengthwise of the shoe to different operative positions for right and left shoes respectively and being further mounted to move yieldingly downward with the shoe relatively to said axis in response to pressure on the bottom of the shoe, and means adjacent to said axis for locking said post and heel rest in any one of said operative positions.

4. In a lasting machine, the combination with toe-lasting means, of means for supporting a shoe for the operation of said toe-lasting means thereon, said shoe-supporting means comprising a post provided with a last pin arranged to extend into the usual spindle hole in the heel end of the last, and a heel rest arranged to engage the heel end of the shoe, said post and heel rest being mounted to swing as a unit about an axis extending lengthwise of the shoe to different positions for right and left shoes, and said post being further mounted to swing about such an axis relatively to the heel rest.

5. In a lasting machine, the combination with toe-lasting means, of means for supporting a shoe for the operation of said toe-lasting means thereon, said shoe-supporting means comprising a post provided with a last pin arranged to extend into the usual spindle hole in the heel end of the last, and a heel rest arranged to engage the heel end of the shoe, said post and heel rest being mounted to swing as a unit about an axis extending lengthwise of the shoe to different positions for right and left shoes, and said post being further mounted to swing yieldingly about such an axis relatively to the heel rest and also to swing relatively to the heel rest about an axis extending widthwise of the shoe.

6. In a lasting machine, the combination with toe-lasting means, of means for supporting a shoe for the operation of said toe-lasting means thereon, said shoe-supporting means comprising a post provided with a last pin arranged to extend into the usual spindle hole in the heel end of the last, a heel rest for engaging the heel end of the shoe, a member common to said post and heel rest for supporting both of them, said member being movable about an axis extending lengthwise of the shoe to carry the post and the heel rest to different positions for right and left shoes, and a friction clutch extending around said axis for locking said member against further movement about said axis after the post and the heel rest have thus been positioned.

7. In a lasting machine, the combination with toe-lasting means, of means for supporting a shoe for the operation of said toe-lasting means thereon, a heel rest arranged to engage the heel end of the shoe, a support for said heel rest mounted for swinging movements about an axis extending lengthwise of the shoe to position the heel rest differently for right and left shoes, and a friction clutch extending around said axis for locking said support against further swinging movement about said axis after the heel rest has thus been positioned.

8. In a lasting machine, the combination with toe-lasting means, of means for supporting a shoe bottom upward for the operation of said toe-lasting means thereon, said shoe-supporting means being mounted to move downwardly with the shoe in response to pressure on the bottom of the shoe, a shoe-bottom rest arranged to engage the bottom of the shoe and to move it downwardly, an operating member movable by the operator to depress the shoe by the movement of said shoe-bottom rest, a heel rest arranged to engage the heel end of the shoe, and means for moving said heel rest lengthwise of the shoe into engagement therewith also by the movement of said operating member.

9. In a lasting machine, the combination with toe-lasting means, of means for supporting a shoe bottom upward for the operation of said toe-lasting means thereon, said shoe-supporting means being mounted to move downwardly with the shoe in response to pressure on the bottom of the shoe, a shoe-bottom rest arranged to engage the bottom of the shoe and to move it downwardly, an operating member movable by the operator to depress the shoe by the movement of said shoe-bottom rest, a heel rest arranged to engage the heel end of the shoe, means for moving said heel rest lengthwise of the shoe into engagement therewith also by the movement of said operating member, and devices controlled by the movement of said operating member for locking said shoe-supporting means against further downward movement and for locking the heel rest against retractive movement lengthwise of the shoe.

10. In a lasting machine, the combination with toe-lasting means, of a toe rest arranged to support the toe end of a shoe mounted on a last and positioned bottom upward for the operation of said toe-lasting means thereon, a heel-end support for the shoe and last arranged to engage the heel end of the last, said toe rest and heel-end support being separately mounted to move downward yieldingly with the shoe in response to pressure applied on the bottom of the shoe, a shoe-bottom rest for engaging the bottom of the shoe and thus moving it downwardly, an operating member movable by the operator for moving said shoe-bottom rest thus to depress the shoe, and devices associated respectively with said toe rest and said heel-end support and controlled by the movement of said operating member for locking the toe rest and the heel-end support against further downward movement.

11. In a lasting machine, the combination with toe-lasting means, of means for supporting a shoe for the operation of said toe-lasting means thereon, a heel rest for engaging the heel end of the shoe, an operating member movable by the operator to move the heel rest lengthwise of the shoe into engagement therewith, a device controlled by the movement of said operating member for locking the heel rest against retractive movement lengthwise of the shoe, said heel rest being further mounted for movements in directions widthwise of the shoe to different positions for right and left shoes, and another device also controlled by the movement of said operating member for locking the heel rest against further movement widthwise of the shoe after it has been thus positioned.

12. In a lasting machine, the combination with toe-lasting means, of means for supporting a shoe for the operation of said toe-lasting means thereon, a heel rest for engaging the heel end of the shoe, an operating member movable by the operator to move said heel rest lengthwise of the shoe into engagement therewith, a device controlled by the movement of said operating member for locking the heel rest against retractive movement lengthwise of the shoe, said heel rest being further mounted for swinging movements about an axis extending lengthwise of the shoe to different positions for right and left shoes, and a friction clutch extending around said axis and also controlled by the movement of said operating member for locking the heel rest against further movement about said axis after it has been thus positioned.

13. In a lasting machine, the combination with toe-lasting means, of means for supporting a shoe including an insole for the operation of said toe-lasting means thereon, a shoe-bottom rest mounted for movement into position to engage the insole and to hold the shoe on said shoe-supporting means, a member movable by the operator thus to move said shoe-bottom rest, an insole edge holddown arranged to engage the marginal portion of the toe end of the insole, means for supporting and guiding said holddown independently of said shoe-bottom rest for movement to operative position, and mechanism for thus moving said holddown also by the movement of said member.

14. In a lasting machine, the combination with toe-lasting means, of means for supporting a shoe including an insole for the operation of said toe-lasting means thereon, a shoe-bottom rest arranged to engage the insole and to hold the shoe on said shoe-supporting means, means for guiding said shoe-bottom rest for movement only widthwise and heightwise of the shoe to operative position, a member movable by the operator thus to move the shoe-bottom rest, an insole edge holddown arranged to engage the marginal portion of the toe end of the insole, means for guiding said holddown independently of the shoe-bottom rest for movement widthwise, lengthwise and heightwise of the shoe to operative position, and mechanism for thus moving said holddown also by the movement of said member.

15. In a lasting machine, the combination with toe-lasting means, of means for supporting a shoe including an insole for the operation of said toe-lasting means thereon, a shoe-bottom rest and an insole edge holddown arranged respectively to engage the bottom of the forepart of the insole and the marginal portion of the toe end of the insole, means for supporting and guiding said shoe bottom rest and holddown independently of each other for movements in different paths into engagement with the insole, and a member common to said shoe-bottom rest and holddown for thus moving them simultaneously into insole-engaging positions.

16. In a lasting machine, the combination with toe-lasting means, of means for supporting a shoe including an insole for the operation of said toe-lasting means thereon, a shoe-bottom rest mounted for movement into position to engage the insole and to hold the shoe on said shoe-supporting means, an insole edge holddown arranged to engage the marginal portion of the toe end of the insole, means for supporting and guiding said holddown independently of said shoe-bottom rest for movement to operative position, a member movable by the operator and common to said shoe-bottom rest and holddown for moving them both to their operative positions, and means for withdrawing said holddown from the insole while the shoe-bottom rest remains in engagement with the insole.

17. In a lasting machine, the combination with toe-lasting means, of means for supporting a shoe including an insole for the operation of said toe-lasting means thereon, a shoe-bottom rest mounted for movement into position to engage the insole and to hold the shoe on said shoe-supporting means, an operating member movable by the operator thus to move the shoe-bottom rest, an insole edge holddown arranged to engage the marginal portion of the toe end of the insole, means for supporting and guiding said holddown independently of said shoe-bottom rest for movement to operative position, mechanism for thus moving said holddown also by the movement of said operating member, said mechanism including a member displaceable to release the holddown while the shoe-bottom rest remains in engagement with the shoe, and a spring for withdrawing the holddown from the insole when it is thus released.

18. In a lasting machine, the combination with toe-lasting means, of means for supporting a shoe including an insole for the operation of said toe-lasting means thereon, a shoe-bottom rest mounted for movement into position to engage the insole and to hold the shoe on said shoe-supporting means, a member movable by the operator thus to move said shoe-bottom rest, an insole edge holddown arranged to engage the marginal portion of the toe end of the insole and supported separately from said shoe-bottom rest for movement to operative position, and mechanism for optionally rendering said member either effective or ineffective to move said holddown also to operative position with the shoe-bottom rest.

19. In a lasting machine, the combination with toe-lasting means, of means for supporting a shoe including an insole for the operation of said toe-lasting means thereon, a shoe-bottom rest mounted for movement into position to engage the insole and to hold the shoe on said shoe-supporting means, a member movable by the operator thus to move said shoe-bottom rest, an insole edge holddown arranged to engage the marginal portion of the toe end of the insole and supported separately from said shoe-bottom rest for movement to operative position, mechanism for moving said holddown to operative position also by the movement of said member, said mechanism having means adjustable to prevent such movement of the holddown when the shoe-bottom rest is moved by said member, and additional means enabling the operator to move the holddown separately to operative position when its movement by said member is thus prevented.

20. In a lasting machine, the combination with toe-embracing wipers for wiping the marginal portion of the toe end of a shoe upper on a last inwardly over an insole on the last, of an insole edge holddown arranged to engage the marginal portion of the toe end of the insole, said holddown comprising a plate so formed as to permit the margin of the upper to be wiped inwardly over it by the wipers while it is in engagement with the insole and further so formed as to cause it thereafter to be deflected from between the wipers and the insole by engagement of the margin of the upper therewith in response to movement of the plate heightwise of the shoe to withdraw it from the insole, and a support for said plate movable with it heightwise of the shoe and also movable lengthwise of the shoe to permit the plate to be thus deflected by the margin of the upper.

21. In a lasting machine, the combination with toe-embracing wipers for wiping the marginal portion of the toe end of a shoe upper on a last inwardly over an insole on the last, of an insole edge holddown arranged to engage the marginal portion of the toe end of the insole, said holddown comprising a plate so formed as to permit the margin of the upper to be wiped inwardly over it by the wipers while it is in engagement with the insole and further so formed as to cause it thereafter to be deflected from between the wipers and the insole by engagement of the margin of the upper therewith in response to movement of the plate heightwise of the shoe to withdraw it from the insole, a support for said plate movable with it heightwise of the shoe as the plate is thus withdrawn from the insole, and means providing a cam track for guiding said support in its movement heightwise of the shoe, said cam track having an offset portion to permit movement of the support lengthwise of the shoe and thus to permit the plate to be deflected by the margin of the upper.

22. In a lasting machine, the combination with toe-lasting means, of means for supporting a shoe bottom upward for the operation of said toe-lasting means thereon, a shoe-bottom rest arranged to engage the bottom of the shoe and to hold the shoe on said shoe-supporting means, a support for said shoe-bottom rest, a lever pivotally connected to said support, and means for swinging said lever to move said support bodily widthwise of the shoe and for thereafter moving the lever bodily downward to carry the support also bodily in that direction and thereby to apply the shoe-bottom rest to the shoe.

23. In a lasting machine, the combination with toe-lasting means, of means for supporting a shoe bottom upward for the operation of said toe-lasting means thereon, a shoe-bottom rest arranged to engage the bottom of the shoe and to hold the shoe on said shoe-supporting means, a support for said shoe-bottom rest, a lever having an upwardly and downwardly extending arm pivotally connected to said support, means for swinging said lever to move said support bodily widthwise of the shoe and for thereafter moving the lever bodily downward to carry the support also bodily in that direction and thereby to apply the shoe-bottom rest to the shoe, and means for controlling said support with respect to movement about its connection with said arm during the operation of the lever.

24. In a lasting machine, the combination with toe-lasting means, of means for supporting a shoe bottom upward for the operation of said toe-lasting means thereon, a shoe-bottom rest arranged to engage the bottom of the shoe and to hold the shoe on said shoe-supporting means, a support for said shoe-bottom rest, a lever having an upwardly and downwardly extending arm pivotally connected to said support, means for swinging said lever to move said support bodily widthwise of the shoe and for thereafter moving the lever bodily downward to carry the support also bodily in that direction and thereby to apply the shoe-bottom rest to the shoe, a roll carried by said support, and means for engaging said roll to control the support with respect to movement about its connection with said arm.

25. In a lasing machine, the combination with toe-lasting means, of means for supporting a shoe bottom upward for the operation of said toe-lasting means thereon, a shoe-bottom rest arranged to engage the bottom of the shoe and to hold the shoe on said shoe-supporting means, a support for said shoe-bottom rest, a lever having an upwardly and downwardly extending arm pivotally connected to said support, means for swinging said lever to move said support bodily widthwise of the shoe and for thereafter moving the lever bodily downwardly to carry the support also bodily in that direction and thereby to apply the shoe-bottom rest to the shoe, and means providing a cam track for guiding said support and for controlling it with respect to movement about its connection with said arm.

26. In a lasting machine, the combination with toe-lasting means, of means for supporting a shoe bottom upward for the operation of said toe-lasting means thereon, a shoe-bottom rest arranged to engage the bottom of the shoe and to hold the shoe on said shoe-supporting means, a support for said shoe-bottom rest arranged to extend forwardly and rearwardly widthwise of the shoe with the shoe-bottom rest on its front end portion, a lever having an upwardly and downwardly extending arm pivotally connected to said support between the front and rear ends of the support, means for swinging said lever to move the support bodily forward and for thereafter moving the lever bodily downward to carry the support also bodily in that direction and thereby to apply the shoe-bottom rest to the shoe, and means providing a cam track arranged to act on the rear end portion of said support to guide it in its forward movement and to control it with respect to movement about is connection with said arm.

References Cited in the file of this patent

UNITED STATES PATENTS

| Number | Name | Date |
|---|---|---|
| 231,076 | McKay et al. | Aug. 10, 1880 |
| 1,693,119 | Pym | Nov. 27, 1928 |
| 1,729,683 | Pym | Oct. 1, 1929 |
| 2,336,035 | Roberts | Dec. 7, 1943 |